Dec. 26, 1967       J. SZECHTMAN       3,360,453
APPARATUS FOR THE RAPID REMOVAL OF BRINE FROM MERCURY CELLS
Original Filed Dec. 17, 1959                    2 Sheets-Sheet 1

INVENTOR.
JOSHUA SZECHTMAN
BY
Albert M. Parker
ATTORNEY.

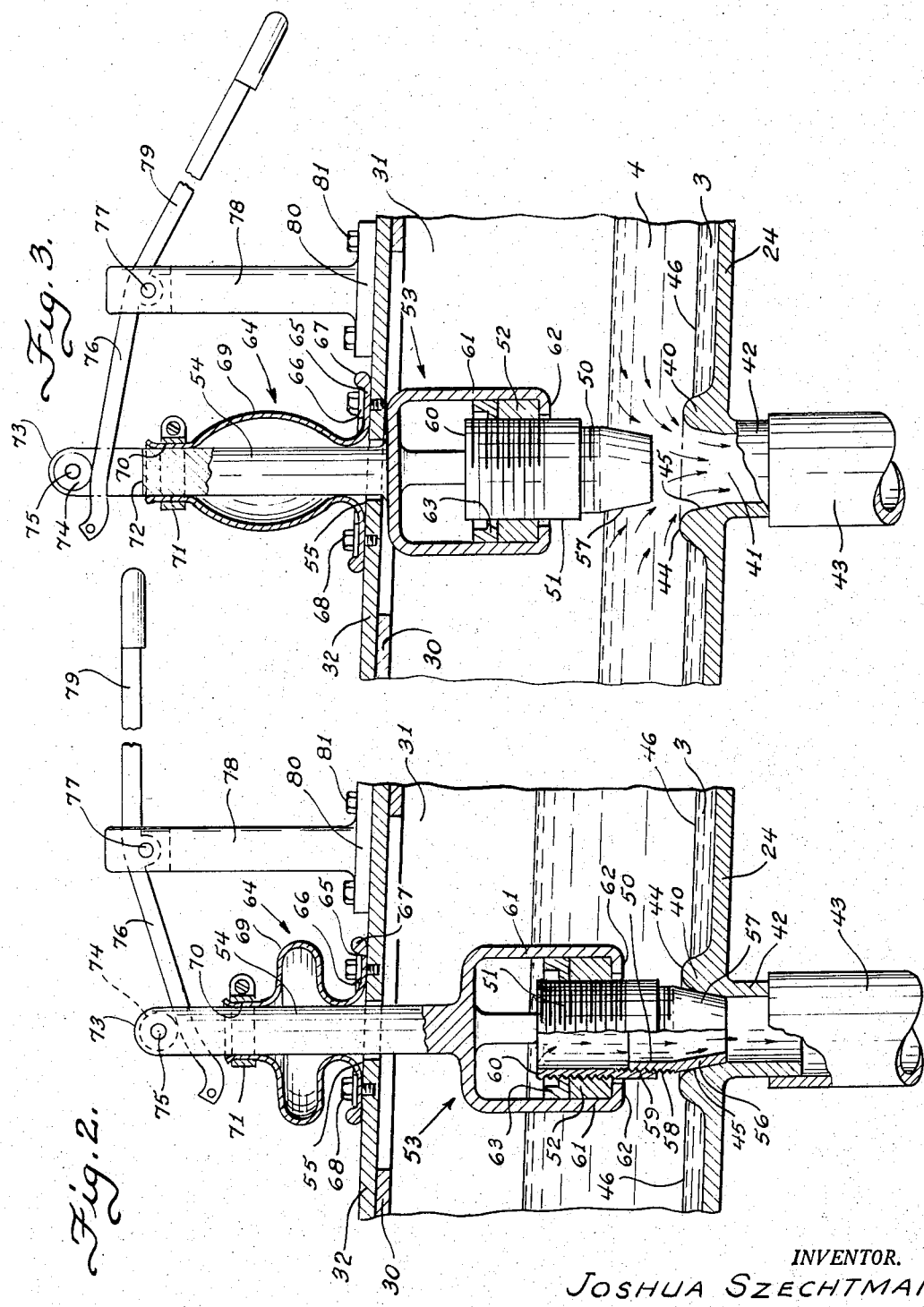

United States Patent Office 3,360,453
Patented Dec. 26, 1967

3,360,453
APPARATUS FOR THE RAPID REMOVAL OF BRINE FROM MERCURY CELLS
Joshua Szechtman, Byram, Conn., assignor to Amroc Incorporated, Zeeland, Mich., a corporation of Michigan
Original application Dec. 17, 1959, Ser. No. 860,294. Divided and this application Sept. 28, 1964, Ser. No. 404,545
7 Claims. (Cl. 204—219)

This application is a division of application Ser. No. 860,294, filed Dec. 17, 1959 which in turn is a continuation-in-part of application Ser. No. 611,980 filed Sept. 25, 1956, both now abandoned.

This invention relates to electrolytic mercury cells and methods for operating the same and is particularly concerned with the control of the level of brine within such cells for rapid removal of such brine when desired.

Cells of the kind here under consideration and methods of operating the same wherein chlorine is produced from brine with a mobile mercury cathode below the brine, and with anodes extending into the brine, always have a considerable amount of chlorine gas present in them while they are in operation. This chlorine gas contains moisture making it very corrosive to metals and many other materials. Also, during the operation of the cell, the layer of sodium chloride brine is permeated with chlorine gas but that gas cannot attack the mercury of the cathode due to the electro-chemical forces which drive the chlorine upwardly away from the mercury. When the operation of the cell is stopped, however, there is a substantial period of time during which nothing stands in the way of the chlorine in the brine attacking the mercury, or, when the mercury is removed, attacking the then exposed steel parts of the cell bottom.

In prior art cells, when the operation of the cell is stopped, the layer of brine is trapped inside and cannot be removed until the cell is opened. This opening must be delayed until the chlorine gas accumulated above the layer of brine has been evacuated. Then the manner in which the cell can be opened is dictated by the necessity of providing proper protection of the operating personnel and surrounding equipment. Also, the method followed in the stopping or shutting down cells in accordance with prior practices required the presence of costly short circuit switch equipment to make sure that the cell was clearly cut out of the circuit and no current could run through it.

The prior art factors all dictated a design of cell that could not be opened at a moment's notice. Furthermore, such factors, as well as the need to maintain a certain level of brine in the cell and the need to safeguard against costly mercury losses through leaks, have dictated designs of mercury cells that would not permit any speedy evacuation of chlorine laden brine. Generally speaking, once you start the operation of a prior art mercury cell of the type here considered, you can't stop it, at least without considerable damage being done to the cell, or loss of mercury, or both.

The invention eliminates the foregoing and other drawbacks of prior art cell constructions and methods of operation and, in fact, converts the mercury cell into a form of apparatus that can be started up and stopped each day if one wishes. It does this by providing methods and means for the speedy evacuation of the brine from the cell, once its operation is stopped while retaining all of the necessary safety features for the cell. The method and apparatus provides for evacuation of the brine without opening the cell, so the chlorine may be safely removed and the brine drawn off without exposing the operating personnel to possible injury and without having the mercury attacked by the chlorine. When the brine is run out the electric path through the cell is eliminated so there is no necessity for expensive short-circuit equipment for by passing the cell.

It is accordingly an object of this invention to provide methods and apparatus for the stopping of the operation of mercury cells without laying the cells open to injury.

Another object is to protect the mercury cathode in electrolytic cells from attack by the chlorine once the action of the cell is stopped.

Another object is to effect the foregoing stoppage without opening the cell.

Still another object is to eliminate costly short-circuit equipment for the by passing of current by the cell.

A more specific object is to provide for the speedy evacuation of brine from a mercury cell whose action has been stopped.

A still further object is to provide for maintaining the evacuating means ineffective during the operation of the cell.

Further and more detailed objects will partly be obvious and will partly be pointed out as the description of the invention taken in conjunction with the accompanying drawing proceeds.

In the drawing:

FIG. 2 is a view greatly enlarged of a portion of the cell carrying the presently preferred form of brine control means, for the carrying out of the method and showing such means in closed position; and FIG. 3 is a similar view showing such means in open position.

Figure 1:
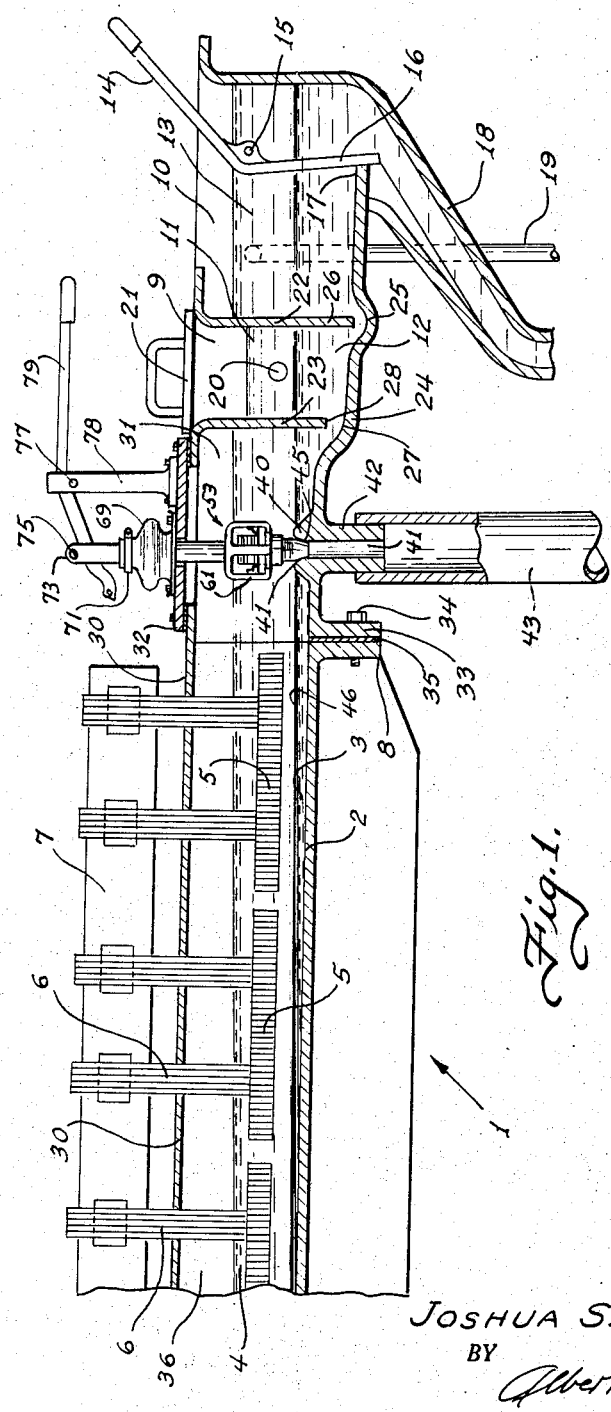
FIG. 1 is a fragmentary vertical section of a portion of an electrolytic mercury cell in accordance with the invention and for carrying out the method of the same.

In mercury cells of the type here contemplated, the primary cell in which the brine is decomposed is normally in the form of a channel member, generally indicated at 1, providing an inclined base 2 over whose upper surface a layer of mercury 3 flows, the flow being to the right as viewed in FIG. 1. The incline here is exaggerated for the purpose of emphasis. This mercury serves as the cathode for the decomposition of the layer of brine 4. Anodes 5 are properly positioned in the brine and in relation to the mercury layer 3 and are properly connected to a suitable source of electric current by means of their stems 6 and a bus bar 7.

At the end 8 of such cells they usually carry an outlet housing providing for the outlet of the brine and a means for the outlet of the mercury with a suitable trap in between so that none of the brine gets to the mercury outlet compartment. As here shown, there is a trap 9 providing for a water seal 11 above the mercury 12 flowing from the brine outlet chamber. The subsequent flushing chamber 10 has a further water seal 13 over the mercury therein and has a suitably formed flushing device 14 pivoted at 15 so that it may be swung to the left to enable the gate portion 16 to be moved away from its side 17 and allow the mercury to be flushed out through the flush tube 18. The tube 19 provides the water inlet for supplying water 13 over the mercury. A similar tube introduces water into the trap 9 through the opening 20.

The trap 9 has a removable cover 21 and has side walls 22 and 23. The side walls 22 and 23 extend transversely across the outlet housing of the cell, the bottom wall 24 of which is recessed in a transverse channel 25 lying beneath the end 26 of the wall 22 and is turned down at 27 beneath the end 28 of the wall 23. These ends and downturned portions serve as part of the trapping to prevent any brine and chlorine gas from getting into the chambers 9 and 10.

The wall 23 forms the end wall of the brine outlet chamber 31 which is no more than a clear continuation of the interior 36 of the cell. In other words there is no trap or other interruption between the normal interior 36 of the cell and the chamber 31. This chamber has a top plate 32 bolted in gas tight engagement to the end of the cover 30 at one side and to the inturned upper end of the wall member 23 at its other side. When properly secured in place the plate 32 positively contains the chlorine gas which collects over the brine. Nevertheless it may be removed for removal and adjustment of the brine level control and dumping means when needed. The cover 30 is secured and tightly fixed in place over the cell interior or through 36, preferably with a plurality of fastenings so that it is necessary to disassemble the cell in order to remove it.

The flanged end 23 of the bottom wall 24 lies in opposition to the end 8 of the cell body and is suitably bolted thereto, as shown at 34, with suitable gasketing means 35 therebetween in order to assure a leakproof joint.

Cells as heretofore devised provided means for taking off brine depleted through an overflow pipe whose open top was just below the surface of the brine in the end chamber. This was a fixed structure, however, and the cover over the chamber was a solid imperforate piece. Thus to remove any brine in excess of the small overflow continually running off, one had first to remove the cover. To do this the cell would have to be shut down, the electric current shut off and short circuited and as much free chlorine as possible in the space above the brine layer in the cell would be removed by vacuum action. As soon as the electric current was shut off, however, a certain amount of the chlorine gas would be taken back into the brine, creating a mixture of chlorine and brine. This mixture would so damage the cell through corrosive action while the cover was being removed, that the cell could not be started up again, at least without material reconditioning. Hence, the general understanding in the prior art has been that once one of these cells was started up you couldn't stop it. The cell and method of operation of the same in accordance with the invention, on the contrary, enable the starting and stopping each day if desired.

Considering the apparatus here disclosed for enabling the method of the invention to be carried out, it is to be noted that a portion of the bottom wall 24 of the outlet housing within the brine outlet chamber 31 has an annular lip 40 formed upwardly therefrom to surround a discharge opening 41. This discharge opening is bordered by a downwardly extending short pipe section 42, to which is secured the runoff conduit 43 for the brine. It will be noted that the lip 40 is rounded over on its upper surface, as seen at 44 and that the mouth of the opening 41 is tapered downwardly and inwardly at 45, all of which is best seen in FIG. 3.

The rounded over top 44 of the lip 40 is formed upwardly to lie just above the upper surface 46 of the stream of mercury 3 flowing past. Thus, when the conduit is open, as seen in FIG. 3, practically all of the brine 4 can run out through that conduit. None of the mercury will escape therethrough due to the resistance resulting from its weight against any action of the brine to draw it along.

Under normal operating conditions, however, the level of the brine in the cell and hence in the outlet compartment 31 will need to be well up within the cell and in the compartment, with only the spent portion close to the top brine surface being allowed to run off. The invention provides for that run-off and, in addition, provides for the instantaneous full opening of the discharge opening 41 so that practically all of the brine in the cell can be quickly dumped.

This control is achieved by the multiple weighted valve member shown in detail in FIGS. 2 and 3 and consisting generally of a lower closing tube 50, an upper overflow tube 51, a weighted ring 52 and a mounting and lifting spider for the tubes and ring, generally indicated at 53. The spider 53 is carried by a shaft 54 which extends up through an opening 55 in the cover 30.

Coming back to the details of this valve arrangement, it is first seen that the lower portion of the tube 50 is tapered inwardly at 56 and its outer surface is given a taper 57 mating with the taper 45 at the mouth of the opening 41. Thus, as seen in FIG. 2, when these are brought together a liquid tight joint is formed and that would be their normal position.

The upper portion of the tube 50 is of cylindrical formation, is screw threaded on its exterior surface at 58 for the threaded reception of the lower portion 59 of the tube 51. Both of these are threaded to sufficient extent to permit them to be adjusted one with respect to the other so that the overflow level provided by the upper end 60 of the tube 51 can be set at the desired height.

The upper portion of the tube 51 is exteriorly screw threaded for the threaded reception of the hold down ring 52. This ring, of substantial weight, assists in holding the valve construction down so that the surface 57 will remain in tight engagement with the surface 45 during the normal operation of the cell. Also, the ring is here used as the lifting means to be engaged by the arms 61 of the spider 53. As here shown, those arms 61 are four in number, extend down past the outer surface of the ring 52, and are turned in beneath the same as shown at 62. Furthermore, if desired, the spider may be formed with a retaining ring 63, L-shaped in cross section, whose vertical portion is secured to the inner surface of the fingers 61 with its bottom horizontal surface seating down on the ring 52 to hold the spider in fixed position with respect to the ring. From what has been said, it will be apparent that this structure will serve the purpose of maintaining the opening 41 closed under normal operation conditions, merely permitting a certain overflow of spent brine down through the tubes into the run-off pipe 42, as illustrated in FIG. 2. When, however, it is desired to quickly dump the brine in the cell, that is achieved by raising the tube 50 so that its seat 57 disengages from the seat 45 and the whole of the opening is exposed for the run-off of the brine.

It is essential, however, that in the normal operation of the cell there be no opening in the cover 30 from which chlorine could escape into the atmosphere. This is taken care of by the provision of a diaphragm type of rubber sleeve, generally indicated at 64. This sleeve is provided with a laterally extending base portion 65 held down against the upper surface of the cover 30 in leak tight engagement therewith by means of an annular metal retaining ring 66 lying within the enlarged bordering bead 67 of the base portion 65. The ring 66 is held down by a plurality of bolts 68 passing therethrough and through the laterally extending portion 65 and secured in the cover 30.

The intermediate portion of the diaphragm member 64 is normally bellied out at 69 in a readily flexible body portion. The upper end of the member 64 is contracted into a collar portion 70 of an internal diameter to snugly receive the outer surface of the shaft 54. The collar portion 70 is tightly clamped against that outer surface by some suitable means, such as the clamping ring 71 here shown. It will be apparent from the fore-going, that though the opening 55 provides easy egress for chlorine gas, since it is sufficiently larger than the shaft 54 to permit for free movement of that shaft, any such gas will be contained by the member 64 and the securement thereof and cannot leak out to the atmosphere. That member is, of course, made of suitable rubberlike material properly resistant to the action of the chlorine. It is sufficientliy pliable that it will yield under the weight of the valve construction with its midportion extending outwardly into a ring shape, as seen in FIG. 2, to permit the surface 57 to effectively seat against the surface 45.

Any suitable means for raising the valve member from the FIG. 2 position to that of FIG. 3 may be provided. It should, however, be one which works freely and easily. As here illustrated the raising is effected by the vertical slotting of the upper end of the valve stem 54 from the position 72 upward to the end 73. The slot has a roller 74 mounted therein by means of a transverse pin 75. This roller is engaged by one arm 76 of a lever-like operating member, which is pivoted at 77 about substantially its mid-point in the slotted upper end of a stanchion 78 with the other end 79 of the operating member extending out from the other side of the pivot 77. The stanchion 78 is suitably mounted on the cover 30 by means of a base plate 80 secured by a plurality of bolts 81.

To carry out the method of the invention utilizing the apparatus here illustrated the cell is set to be put into operation by first setting the members 50 and 51 with respect to each other so that the overflow end 60 will be at a desired position for the proper amount of overflow while the surfaces 57 and 45 are seated together to form a leakproof joint. The valve member will then have the position illustrated in FIGS. 1 and 2. The mobile mercury cathode is caused to flow, the brine is introduced on top of it to the desired depth and the electric current is turned on. The brine is decomposed giving off chlorine gas while the alkali, such as sodium forms an amalgam with the mercury. Caustic soda is also formed. The chlorine gas is taken off from above the brine. The brine is continuously replenished and spent brine runs off by overflowing the surface 60 as seen in FIGS. 2 and 3. So long as the current is kept on chlorine will flow away from the brine but once the current is cut off the chlorine still present tends to be reabsorbed by the brine making a very corrosive mixture. The method of the invention prevents this from happening and, at the same time, eliminates the electrical path through the cell.

According to the method of the invention when it is desired to stop the operation of the cell, the current is cut off and almost simultaneously the handle 79 is pressed down, thereby raising the stem of the shaft 54 and bringing the valve member 50 off its seat. This quickly dumps all of the brine from the cell through the conduit 43, possibly leaving just a little on top of the mercury in the compartment 31 for subsequent draining. The slope on which the cell is set and operates assures that any brine left will be such small amount as may be left in the compartment 31 after the dumping of the brine has been completed. Thus the brine from the cell and any chlorine contained therein is removed so rapidly that corrosive action on the cell is practically eliminated. There is no need to wait until the chlorine gas is removed and the cell is opened. As soon as the brine level falls below the lower surfaces of the anodes 5 no current can flow so no short circuiting of the cell is needed. Best of all the cell is undamaged and can be started up again without opening the valve and whenever desired merely by letting the valve member 50 return to its closed position, reintroducing mercury and brine and turning on the current.

Effective reclosing of the valve 45-56 is assured by virtue of the weight of the valve member itself enhanced by the substantial additional weight of the ring 52. As previously pointed out, the ring 52 is of substantial weight and serves to assure that the tapered surfaces 45 and 57 will remain in liquid tight engagement once they are seated together and the cell is in operation. Thus, the method of operating and stopping electrolytic cells in accordance with the invention converts them from something that can be started and not stopped into apparatus which can be stopped and restarted as desired.

In the foregoing description and accompanying drawing the method of the invention has been illustrated as being carried out by the use of one particular form of overdump valve. It is, of course, to be understood, however, that such showing is merely for illustrative and not limiting purposes and that alternatives thereof and variations therein as would suggest themselves to those skilled in the art can be employed without departing from the spirit and scope of the invention. Speaking more generally, since certain changes in the method of operation and in the construction set forth may be made without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Apparatus for the rapid removal of brine from mercury cells comprising a cell and a chamber member secured to the outlet end thereof, enclosing means for sealing said cell and chamber from the atmosphere, the interior of said chamber forming an uninterrupted continuation of the interior of said cell and being formed with means for maintaining a stream of mercury therein at a predetermined level, a discharge conduit connected to the bottom of said chamber for the removal of the brine from the cell, said conduit having an opening with inward and downward taper and having a rounded lip adjacent said predetermined mercury level, a tubular valve extending to a predetermined brine level which is maintained during operation of the cell and having an inward and downward taper for sealing fit and seated in said opening and normally closed for retaining the brine in the cell, and means for opening the valve quickly to discharge the brine rapidly from the cell and chamber while retaining the sealing of said cell and chamber from the atmosphere, said means for opening the valve including a manually operable handle exterior to the enclosing means, and flexible means secured to a portion of said valve stem and said enclosing means to permit the operation of the valve without permitting the escape of gas from said cell.

2. Apparatus as set forth in claim 1 wherein said valve includes telescoping members for axial adjustment of the valve seat.

3. Apparatus as set forth in claim 2 wherein said valve includes weight members for urging the valve to remain in its closed position.

4. In electrolytic mercury cell construction, an elongated hollow sealed cell member and a sealed chamber member joined to the outlet end of said cell member and having its interior forming an uninterrupted extension of the interior of said cell member and being provided with means for maintaining a stream of mercury therein at a predetermined level with brine to to be electrolyzed overlying said mercury, a discharged conduit connected to the bottom of said chamber member for the rapid removal of the brine from said members without removing the mercury from below it, said conduit having an opening with an inward and downward taper and having a rounded lip adjacent to the bottom level of the brine but above said level of the mercury, a valve having an inward and downward taper for sealing fit and seated in said opening and normally closing said opening for retaining the brine in said cell, means for opening said valve to rapidly discharge the brine while maintaining said members in sealed relationship with respect to the atmosphere, said valve opening means including a valve stem which extends exteriorly of said members, and flexible sealing means secured to a portion of said valve stem and to the top of said chamber member providing for the full operation of said valve while preventing the escape of gas from said members.

5. Apparatus as set forth in claim 4 wherein in addition the valve is tubular and extends to a predetermined brine level such that excess brine overflows through the tube and conduit and out of the cell.

6. Apparatus as set forth in claim 5 wherein the overflow opening of the tubular valve is adjustable in height to predetermine the brine level in the cell.

7. Apparatus as set forth in claim 6 wherein the valve includes the combination of the valve stem connected to a tubular member inside the chamber so that the tubular member is open at a predetermined brine level and the seating portion of the valve is in threaded connection with the tubular member, the combination of the tubular member and seating portion forming telescoping members.

References Cited

UNITED STATES PATENTS 320,950   6/1885   McHugh ---------------- 4—61
478,793   7/1892   Glover ----------------- 4—61

FOREIGN PATENTS 411,385   8/1945   Italy.

JOHN H. MACK, *Primary Examiner.*

HOWARD S. WILLIAMS, *Examiner.*